(12) United States Patent
Nakamura et al.

(10) Patent No.: US 12,455,328 B2
(45) Date of Patent: Oct. 28, 2025

(54) MAGNETIC SENSOR, POSITION DETECTOR INCLUDING THE SAME, AND METHOD OF MANUFACTURING MAGNETIC SENSOR

(71) Applicant: Murata Manufacturing Co., Ltd., Nagaokakyo (JP)

(72) Inventors: Daisuke Nakamura, Nagaokakyo (JP); Takahiro Ibusuki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 150 days.

(21) Appl. No.: 18/406,544

(22) Filed: Jan. 8, 2024

(65) Prior Publication Data
US 2024/0219489 A1    Jul. 4, 2024

Related U.S. Application Data

(63) Continuation of application No. PCT/JP2022/023980, filed on Jun. 15, 2022.

(30) Foreign Application Priority Data

Aug. 4, 2021    (JP) ................................ 2021-128367

(51) Int. Cl.
*G01R 33/09*     (2006.01)
*G01R 33/00*     (2006.01)
*H10N 50/10*     (2023.01)

(52) U.S. Cl.
CPC ....... *G01R 33/093* (2013.01); *G01R 33/0052* (2013.01); *G01R 33/098* (2013.01); *H10N 50/10* (2023.02)

(58) Field of Classification Search
CPC .............. G01R 33/093; G01R 33/0052; G01R 33/098; H10N 50/10
See application file for complete search history.

(56) References Cited

U.S. PATENT DOCUMENTS 7,808,749 B2 * 10/2010 Kou .................. H10N 50/01
                                                          360/324.1
8,191,235 B2 *  6/2012 Takahashi .......... H10N 50/10
                                                           29/603.15
(Continued)

FOREIGN PATENT DOCUMENTS

JP     2014-016161 A    1/2014
JP     2015-014520 A    1/2015
(Continued)

OTHER PUBLICATIONS

Official Communication issued in International Patent Application No. PCT/JP2022/023980, mailed on Sep. 6, 2022.

*Primary Examiner* — Reena Aurora
(74) *Attorney, Agent, or Firm* — Keating & Bennett, LLP

(57) ABSTRACT

An output value of a magnetic sensor when an intensity of a signal magnetic field is zero is displaced from zero due to a difference between a magnetization state of magnetized fixed layers of magnetoresistance effect stacks in each of a first magnetoresistance effect element and a fourth magnetoresistance effect element and a magnetization state of magnetized fixed layers of magnetoresistance effect stacks in each of a second magnetoresistance effect element and a third magnetoresistance effect element.

20 Claims, 11 Drawing Sheets

(56) References Cited

U.S. PATENT DOCUMENTS

| | | | | |
|---|---|---|---|---|
| 8,466,676 | B2* | 6/2013 | Saruki | G01R 33/091 |
| | | | | 324/252 |
| 11,156,478 | B2* | 10/2021 | Takano | G01R 33/098 |
| 2013/0134970 | A1* | 5/2013 | Schuhl | G01R 33/098 |
| | | | | 427/127 |
| 2014/0009145 | A1 | 1/2014 | Suto | |
| 2015/0185297 | A1 | 7/2015 | Zimmer et al. | |
| 2016/0238675 | A1* | 8/2016 | Ide | H10N 50/85 |
| 2018/0094950 | A1* | 4/2018 | Ohta | G01R 33/098 |
| 2018/0164387 | A1 | 6/2018 | Raberg | |
| 2018/0274897 | A1 | 9/2018 | Uchida et al. | |
| 2020/0319273 | A1 | 10/2020 | Saito | |
| 2021/0382123 | A1 | 12/2021 | Kubota et al. | |

FOREIGN PATENT DOCUMENTS

| | | |
|---|---|---|
| JP | 2016-166748 A | 9/2016 |
| JP | 2018-107280 A | 7/2018 |
| JP | 2018-162995 A | 10/2018 |
| JP | 2019-028340 A | 2/2019 |
| WO | 2019/131392 A1 | 7/2019 |
| WO | 2020/208907 A1 | 10/2020 |

* cited by examiner

MAGNETIC SENSOR, POSITION DETECTOR INCLUDING THE SAME, AND METHOD OF MANUFACTURING MAGNETIC SENSOR

CROSS REFERENCE TO RELATED APPLICATIONS

This application claims the benefit of priority to Japanese Patent Application No. 2021-128367 filed on Aug. 4, 2021 and is a Continuation Application of PCT Application No. PCT/JP2022/023980 filed on Jun. 15, 2022. The entire contents of each application are hereby incorporated herein by reference.

BACKGROUND OF THE INVENTION

1. Field of the Invention

The present invention relates to magnetic sensors, position detectors including the same, and methods of manufacturing magnetic sensors.

2. Description of the Related Art

The prior art discloses an actuator driver capable of camera shake compensation is Japanese Patent Laid-Open No. 2019-28340. The actuator driver disclosed in Japanese Patent Laid-Open No. 2019-28340 includes a Hall element, a magnet that applies a magnetic field to the Hall element, and a driver integrated circuit (IC) that receives an input of detection signal from the Hall element. The driver IC performs driving control based on changes in output of the Hall element due to a relative positional change between the Hall element and the magnet.

In general, the Hall element has an output value of zero when the intensity of a magnetic field applied is zero, and the Hall element and the magnet need to be arranged such that the output value of the Hall element is zero when the magnet is located at a reference position relative to the Hall element in terms of the performance of the driver IC. This results in a lower degree of flexibility in designing a magnetic circuit with regard to the arrangement relationship between the magnet and a magnetic sensor such as the Hall element.

SUMMARY OF THE INVENTION

Example embodiments of the present invention provide magnetic sensors, position detectors including the same, and methods of manufacturing magnetic sensors, which are each able to increase the flexibility in designing a magnetic circuit.

A magnetic sensor according to an example embodiment of the present invention includes a first magnetoresistance effect element, a second magnetoresistance effect element, a third magnetoresistance effect element electrically connected to each other to define a bridge circuit. Upon application of a signal magnetic field, the second magnetoresistance effect element and the third magnetoresistance effect element have a resistance change opposite in direction to the first magnetoresistance effect element and the fourth magnetoresistance effect element. Each of the first magnetoresistance effect element, the second magnetoresistance effect element, the third magnetoresistance effect element, and the fourth magnetoresistance effect element includes a plurality of magnetoresistance effect stacks electrically connected to each other. Each of the plurality of magnetoresistance effect stacks includes a magnetized fixed layer, a non-magnetic layer, and a magnetized free layer stacked in this order, and a magnetization direction of the magnetized free layer changes according to the signal magnetic field. In each of the first magnetoresistance effect element and the fourth magnetoresistance effect element, the magnetized fixed layer has a magnetization state fixed to a first direction in all of the plurality of magnetoresistance effect stacks. In each of the second magnetoresistance effect element and the third magnetoresistance effect element, the magnetized fixed layer has a magnetization state fixed to a second direction opposite to the first direction in some of the plurality of magnetoresistance effect stacks, and others of the plurality of magnetoresistance effect stacks include at least one of a portion in which the magnetized fixed layer has a magnetization state fixed to a direction different from the second direction and a portion in which the magnetized fixed layer has a magnetization state where a magnetization direction changes according to the signal magnetic field. An output value of the magnetic sensor when an intensity of the signal magnetic field is zero is displaced from zero due to a difference between the magnetization state of a plurality of the magnetized fixed layers of the plurality of magnetoresistance effect stacks in each of the first magnetoresistance effect element and the fourth magnetoresistance effect element and the magnetization state of a plurality of the magnetized fixed layers of the plurality of magnetoresistance effect stacks in each of the second magnetoresistance effect element and the third magnetoresistance effect element.

According to example embodiments of the present invention, the degree of flexibility in designing magnetic circuits is able to be increased.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
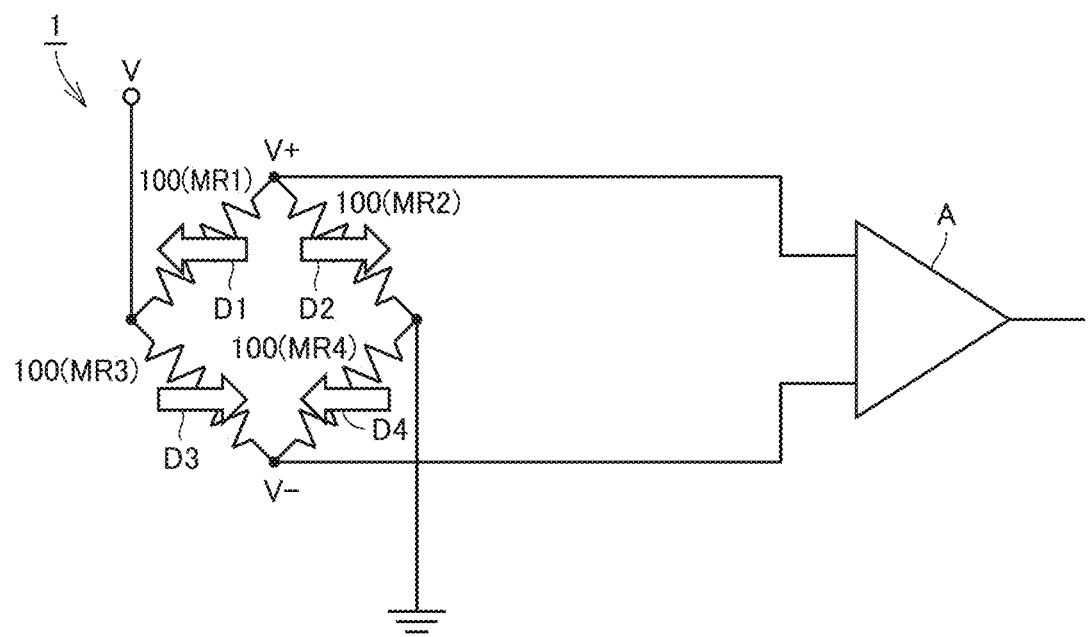
FIG. 1 is a circuit diagram showing a configuration of a magnetic sensor according to an example embodiment of the present invention.

Magnetic sensors, position detectors including the same, and methods of manufacturing magnetic sensors according to examples embodiments of the present invention will be described below with reference to the drawings. In the description of example embodiments below, the same or corresponding elements in the drawings are denoted by the same reference characters, and description thereof will not be repeated.

FIG. 1 is a circuit diagram showing a configuration of a magnetic sensor according to an example embodiment of the present invention. As shown in FIG. 1, a magnetic sensor 1 according to an example embodiment of the present invention includes a first magnetoresistance effect element 100 (MR1), a second magnetoresistance effect element 100 (MR2), a third magnetoresistance effect element 100 (MR3), and a fourth magnetoresistance effect element 100 (MR4).

First magnetoresistance effect element 100 (MR1), second magnetoresistance effect element 100 (MR2), third magnetoresistance effect element 100 (MR3), and fourth magnetoresistance effect element 100 (MR4) are electrically connected to each other by a full bridge to define a bridge circuit.

Specifically, a first series circuit including first magnetoresistance effect element 100 (MR1) and second magnetoresistance effect element 100 (MR2) connected in series to each other and a second series circuit including third magnetoresistance effect element 100 (MR3) and fourth magnetoresistance effect element 100 (MR4) connected in series to each other are connected in parallel. A driving voltage V can be applied to the bridge circuit. A midpoint V+ of the first series circuit and a midpoint V− of the second series circuit are electrically connected to a differential amplifier A.

As shown in FIG. 1, a direction of detection axis D1 of first magnetoresistance effect element 100 (MR1) and a direction of detection axis D4 of fourth magnetoresistance effect element 100 (MR4) are opposite to a direction of detection axis D2 of second magnetoresistance effect element 100 (MR2) and a direction of detection axis D3 of third magnetoresistance effect element 100 (MR3).

Thus, upon application of a signal magnetic field, second magnetoresistance effect element 100 (MR2) has a resistance change opposite to the direction of first magnetoresistance effect element 100 (MR1). Similarly, upon application of a signal magnetic field, third magnetoresistance effect element 100 (MR3) shows a resistance change opposite in direction to fourth magnetoresistance effect element 100 (MR4).

Figure 2:
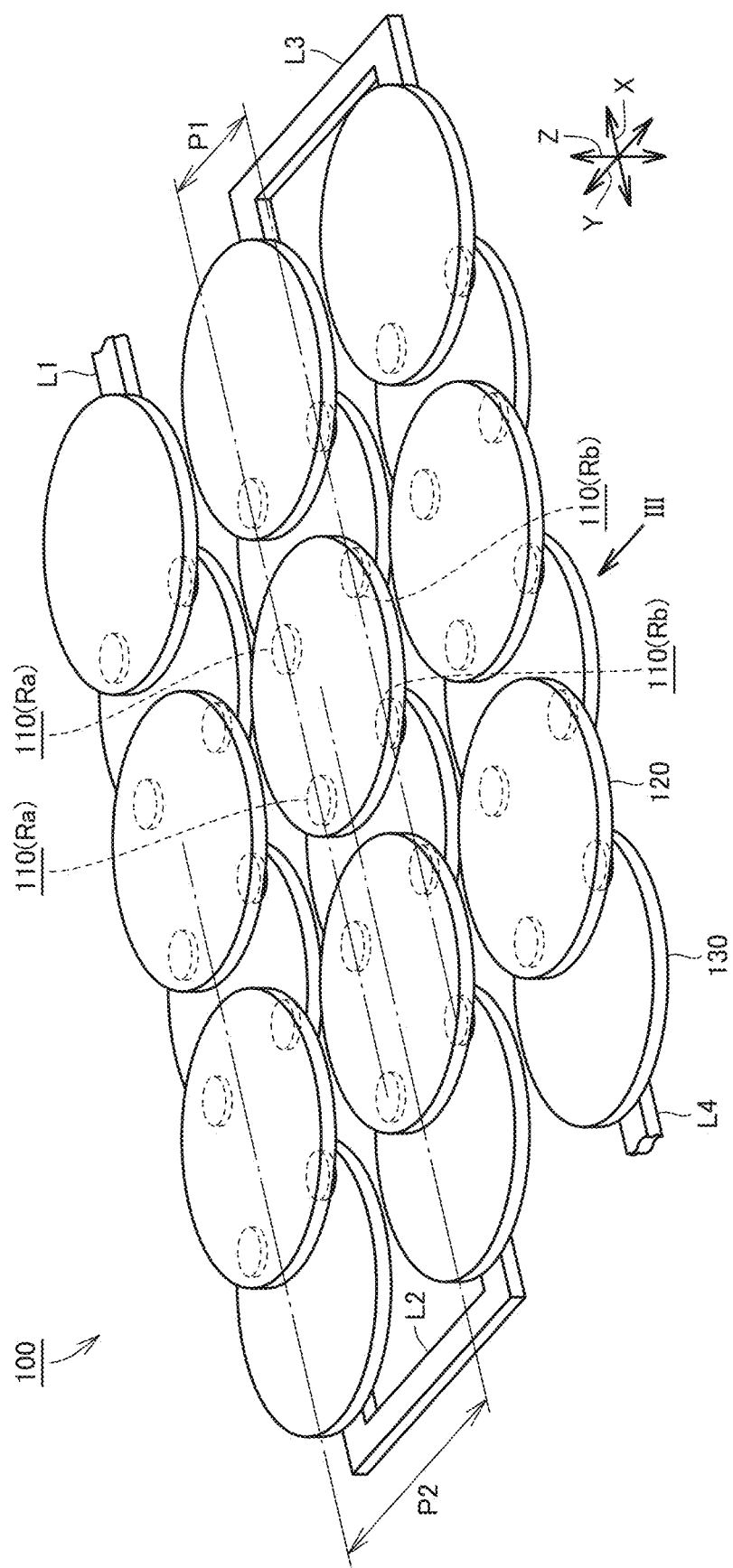
FIG. 2 is a perspective view showing a configuration of a magnetoresistance effect element of a magnetic sensor according to an example embodiment of the present invention.
Figure 3:
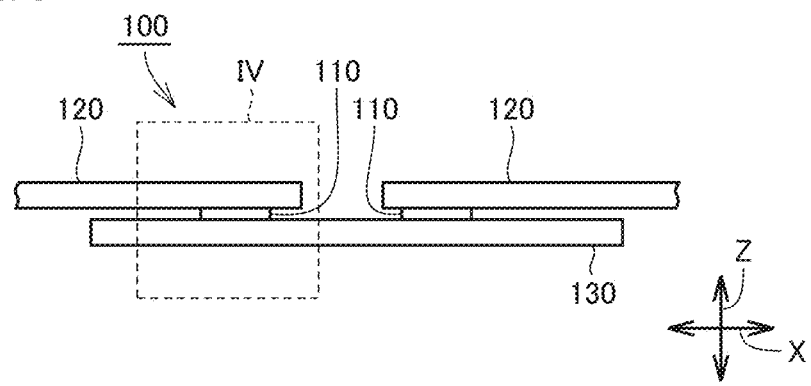
FIG. 3 is a partial side view of the magnetoresistance effect element of FIG. 2, which is viewed from the arrow III direction.
Figure 4:
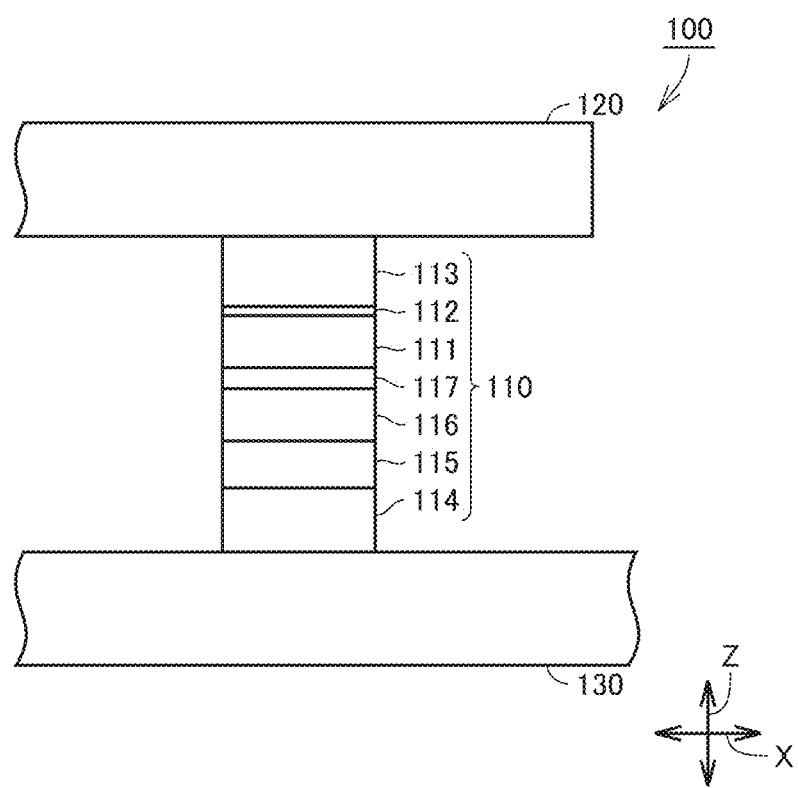
FIG. 4 is a partial side view of the portion IV of the magnetoresistance effect element of FIG. 3 in an enlarged manner.

FIG. 2 is a perspective view showing a configuration of a magnetoresistance effect element of a magnetic sensor according to an example embodiment of the present invention. FIG. 3 is a partial side view of the magnetoresistance effect element of FIG. 2, which is viewed from the arrow III direction. FIG. 4 is a partial side view of the portion IV of the magnetoresistance effect element of FIG. 3 in an enlarged manner.

As shown in FIGS. 2 to 4, magnetoresistance effect element 100 of the magnetic sensor according to an example embodiment of the present invention includes upper electrodes 120, lower electrodes 130, and magnetoresistance effect stacks 110 sandwiched between upper electrodes 120 and lower electrodes 130.

Upper electrodes 120 are arranged in a matrix while being spaced from each other in the X-axis direction and the Y-axis direction. In the present example embodiment, upper electrode 120 has a disk shape. The diameter of upper electrode 120 is, for example, about 9 μm. The thickness of upper electrode 120 is, for example, about 0.1 μm. An interval P2 between the centers of upper electrodes 120 adjacent to each other is, for example, about 20 μm.

Lower electrodes 130 are arranged in a matrix while being spaced from each other in the X-axis direction and the Y-axis direction. In the present example embodiment, lower electrode 130 has a disk shape. The diameter of lower electrode 130 is, for example, about 9 μm. The thickness of lower electrode 130 is, for example, about 0.1 μm. Interval P2 between the centers of lower electrodes 130 adjacent to each other is, for example, about 20 μm. Lower electrode 130 faces a portion of upper electrode 120 while being spaced from each other in the Z-axis direction.

Magnetoresistance effect stack 110 is sandwiched between upper electrode 120 and lower electrode 130 facing each other. Magnetoresistance effect stack 110 has a cylindrical or substantially cylindrical shape. The diameter of magnetoresistance effect stack 110 is, for example, about 3 μm. The thickness of magnetoresistance effect stack 110 is, for example, about 0.035 μm.

In the present example embodiment, first magnetoresistance effect stacks Ra and second magnetoresistance effect stacks Rb are arranged while being spaced from each other in the Y-axis direction between upper electrodes 120 and lower electrodes 130 facing each other. An interval P1 between the centers of first magnetoresistance effect stack Ra and second magnetoresistance effect stack Rb adjacent to each other is, for example, about 10 µm. The interval between the centers of first magnetoresistance effect stacks Ra adjacent to each other in the X-axis direction is, for example, about 10 µm. The interval between the centers of second magnetoresistance effect stacks Rb adjacent to each other in the X-axis direction is, for example, about 10 µm.

In the present example embodiment, magnetoresistance effect element 100 is a tunnel magneto resistance (TMR) element. Magnetoresistance effect element 100 may be a giant magnetoresistance (GMR) element. In magnetoresistance effect stack 110, a magnetized fixed layer, a non-magnetic layer, and a magnetized free layer whose magnetization direction changes according to a signal magnetic field are stacked in order.

Specifically, as shown in FIG. 4, an underlayer 114, an antiferromagnetic layer 115, a pinned layer 116, a coupling layer 117, a reference layer 111, a non-magnetic layer 112, and a magnetized free layer 113 are stacked in this order on lower electrode 130. Herein, a multilayer ferri-fixed layer composed of pinned layer 116, coupling layer 117, and reference layer 111 is a magnetized fixed layer.

Magnetized free layer 113 is a soft ferromagnetic layer whose magnetization direction changes according to an external magnetic field such as a signal magnetic field. Magnetized free layer 113 is made of a magnetic material mainly containing at least one element of Co, Fe and Ni. For example, magnetized free layer 113 may be made of CoFe, NiFe, CoFeB, a Heusler alloy, or the like. Magnetized free layer 113 may include a single layer or a multilayer ferri-free layer.

Non-magnetic layer 112 is a non-magnetic tunnel barrier layer made of, for example, MgO, which is a layer thin enough to allow a tunnel current based on quantum mechanics to pass therethrough. Non-magnetic layer 112 may be, for example, made of an oxide or a nitride of Al, Ti, or Hf, in addition to MgO.

Reference layer 111 is antiferromagnetically coupled to pinned layer 116 via coupling layer 117. In other words, the magnetization direction of reference layer 111 is antiparallel to the magnetization direction of pinned layer 116. Reference layer 111 is made of a ferromagnetic material such as, for example, CoFe, CoFeB, or a Heusler alloy.

Coupling layer 117 is made of a non-magnetic material, such as, for example, Ru, Ir, Rh, or Cr, that exhibits RKKY interaction. Pinned layer 116 is made of a ferromagnetic material such as, for example, CoFe or CoFeB. Antiferromagnetic layer 115 is made of an antiferromagnetic material including Mn, such as, for example, an alloy including Mn and any one element of Ni, Fe, Pd, Pt, and Ir, an alloy including Pd, Pt, and Mn, or an alloy including Cr, Pt, and Mn. Specifically, antiferromagnetic layer 115 is made of, for example, IrMn, PtMn, PdPtMn, CrPtMn.

Underlayer 114 is provided for appropriate growth of crystals of antiferromagnetic layer 115. Underlayer 114 is made of, for example, Ta, W, Mo, Cr, Ti, Zr, Ni, Au, Ag, Cu, Pt, Ru, or Ni—Fe.

As shown in FIG. 2, a plurality of electrode arrays including upper electrodes 120 and lower electrodes 130 arranged in the X-axis direction are connected to each other by a wiring line and are wired in a meandering shape. Specifically, a first wiring line L1 is connected to upper electrode 120 located at an end of a first electrode array. Lower electrodes 130 located at the respective ends of the first electrode array and a second electrode array are connected to each other by a second wiring line L2. Upper electrodes 120 located at the respective ends of the second electrode array and a third electrode array are connected to each other by a third wiring line L3. A fourth wiring line L4 is connected to lower electrode 130 located at an end of the third electrode array.

The configuration of magnetoresistance effect element 100 is not limited to the above, and magnetoresistance effect element 100 is merely required to have a configuration that enables detection of a signal magnetic field.

Figure 5:
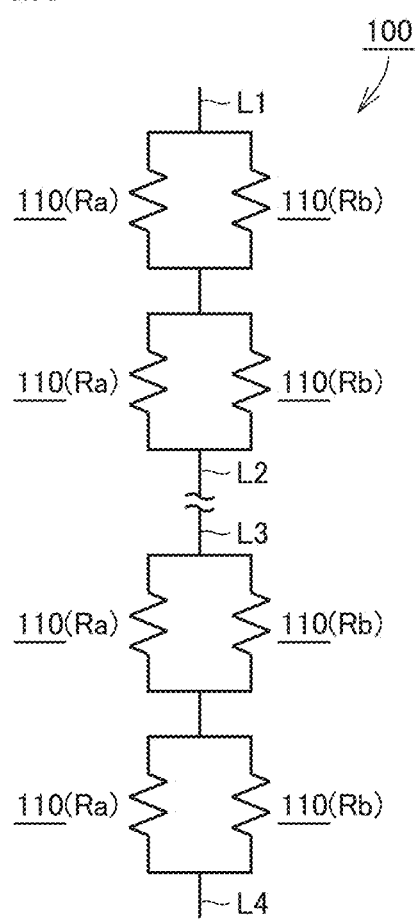
FIG. 5 is a circuit diagram showing electrical connection of the magnetoresistance effect element of a magnetic sensor according to an example embodiment of the present invention.

FIG. 5 is a circuit diagram showing electrical connection of a magnetoresistance effect element of a magnetic sensor according to an example embodiment of the present invention. As shown in FIG. 5, in magnetoresistance effect element 100, a plurality of parallel connection portions, each including first magnetoresistance effect stack Ra and second magnetoresistance effect stack Rb connected in parallel, are connected in series to each other. The manner of electrical connection in magnetoresistance effect element 100 is not limited to the manner shown in FIG. 5, and it suffices that magnetoresistance effect stacks 110 are electrically connected to each other sequentially in series or in parallel.

Figure 6:
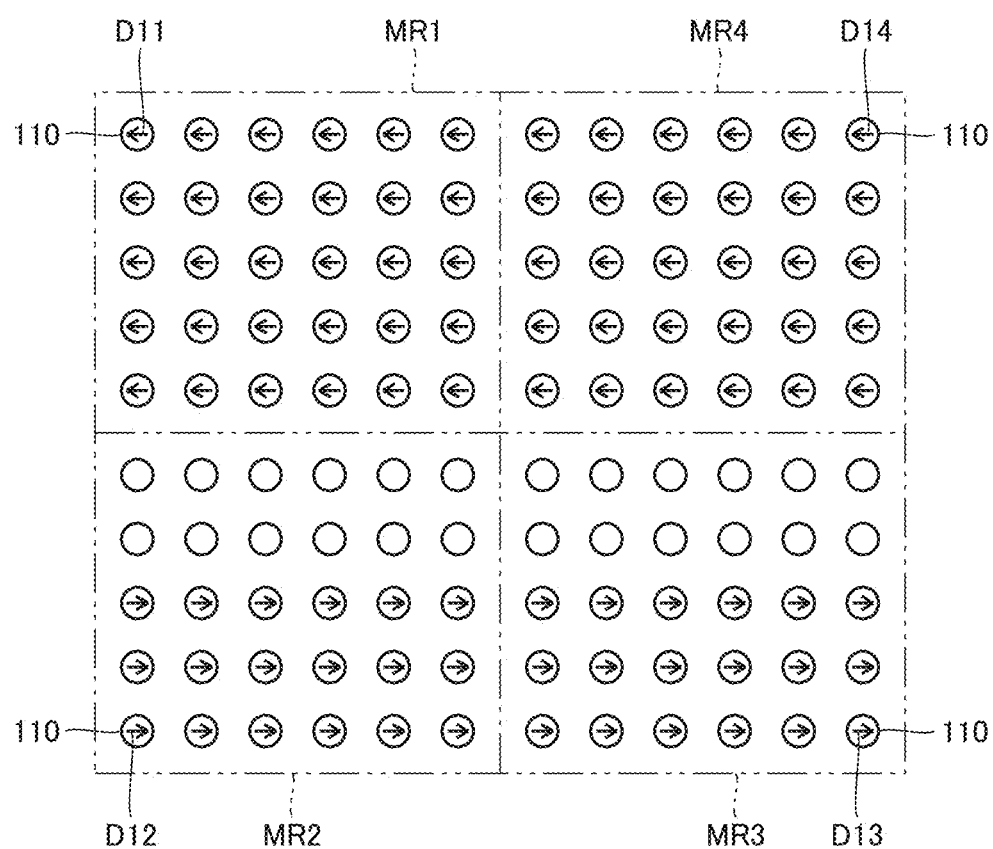
FIG. 6 is a cross-sectional view showing a magnetization state of magnetized fixed layers of magnetoresistance effect stacks of each in a first magnetoresistance effect element, a second magnetoresistance effect element, a third magnetoresistance effect element, and a fourth magnetoresistance effect element of a magnetic sensor according to an example embodiment of the present invention.

FIG. 6 is a cross-sectional view showing a magnetization state of magnetized fixed layers of magnetoresistance effect stacks in each of the first magnetoresistance effect element, the second magnetoresistance effect element, the third magnetoresistance effect element, and the fourth magnetoresistance effect element of the magnetic sensor according to an example embodiment of the present invention.

As shown in FIG. 6, the number of magnetoresistance effect stacks 110 of first magnetoresistance effect element 100 (MR1), second magnetoresistance effect element 100 (MR2), third magnetoresistance effect element 100 (MR3), and fourth magnetoresistance effect element 100 (MR4) are equal to each other.

Thus, the maximum electrical resistance values that can be maintained by magnetoresistance effect stacks 110 of first magnetoresistance effect element 100 (MR1), second magnetoresistance effect element 100 (MR2), third magnetoresistance effect element 100 (MR3), and fourth magnetoresistance effect element 100 (MR4) is equal or substantially equal to each other. The maximum electrical resistance value that can be maintained by magnetoresistance effect stacks 110 is the sum of the respective electrical resistance values shown by magnetoresistance effect stacks 110 upon application of a signal magnetic field when all of the respective magnetized fixed layers of magnetoresistance effect stacks 110 have a magnetization state fixed to the same direction in magnetoresistance effect element 100.

As shown in FIG. 6, in the present example embodiment, magnetoresistance effect stacks 110 included in first magnetoresistance effect element 100 (MR1), second magnetoresistance effect element 100 (MR2), third magnetoresistance effect element 100 (MR3), and fourth magnetoresistance effect element 100 (MR4) are located with a two-fold rotational symmetry as viewed from the stack direction (Z-axis direction) of magnetoresistance effect stacks 110.

Magnetoresistance effect stacks 110 included in first magnetoresistance effect element 100 (MR1), second magnetoresistance effect element 100 (MR2), third magnetoresistance effect element 100 (MR3), and fourth magnetoresistance effect element 100 (MR4) may be located with a four-fold rotational symmetry as viewed from the stack direction (Z-axis direction) of magnetoresistance effect stacks 110.

Magnetoresistance effect stacks 110 included in first magnetoresistance effect element 100 (MR1), second magnetoresistance effect element 100 (MR2), third magnetoresistance effect element 100 (MR3), and fourth magnetoresistance effect element 100 (MR4) are not always required to be located with rotational symmetry.

As shown in FIG. 6, in all of magnetoresistance effect stacks 110 in each of first magnetoresistance effect element 100 (MR1) and fourth magnetoresistance effect element 100 (MR4), the magnetized fixed layer has a magnetization state fixed to a first direction. Specifically, a magnetization direction D11 of reference layers 111 of all of magnetoresistance effect stacks 110 in first magnetoresistance effect element 100 (MR1) and a magnetization direction D14 of reference layers 111 of all of magnetoresistance effect stacks 110 in fourth magnetoresistance effect element 100 (MR4) are fixed toward the first direction.

In some of magnetoresistance effect stacks 110 in each of second magnetoresistance effect element 100 (MR2) and third magnetoresistance effect element 100 (MR3), the magnetized fixed layer has a magnetization state fixed to a second direction opposite to the first direction. Specifically, a magnetization direction D12 of reference layers 111 of some of magnetoresistance effect stacks 110 in second magnetoresistance effect element 100 (MR2) and a magnetization direction D13 of reference layers 111 of some of magnetoresistance effect stacks 110 in third magnetoresistance effect element 100 (MR3) are fixed toward the second direction.

In the present example embodiment, in the others of magnetoresistance effect stacks 110 in each of second magnetoresistance effect element 100 (MR2) and third magnetoresistance effect element 100 (MR3), the magnetized fixed layer has a magnetization state where the magnetization direction changes according to a signal magnetic field. In other words, reference layers 111 of the others of magnetoresistance effect stacks 110 in each of second magnetoresistance effect element 100 (MR2) and third magnetoresistance effect element 100 (MR3) do not have a fixed magnetization direction.

In the others of magnetoresistance effect stacks 110 in each of second magnetoresistance effect element 100 (MR2) and third magnetoresistance effect element 100 (MR3), the magnetized fixed layer may have a magnetization state fixed to a direction different from the second direction. In other words, reference layers 111 of the others of magnetoresistance effect stacks 110 in each of second magnetoresistance effect element 100 (MR2) and third magnetoresistance effect element 100 (MR3) may be fixed toward the direction different from the second direction. The direction different from the second direction is, for example, the first direction.

The others of magnetoresistance effect stacks 110 in each of second magnetoresistance effect element 100 (MR2) and third magnetoresistance effect element 100 (MR3) may have both of a portion in which the magnetized fixed layer has a magnetization state where the magnetization direction changes according to a signal magnetic field and a portion in which the magnetized fixed layer has a magnetization state fixed to the direction different from the second direction.

With the configuration described above, each of first magnetoresistance effect element 100 (MR1), second magnetoresistance effect element 100 (MR2), third magnetoresistance effect element 100 (MR3), and fourth magnetoresistance effect element 100 (MR4) detects a magnetic field component in the direction orthogonal or substantially orthogonal to the stack direction (Z-axis direction) of magnetoresistance effect stacks 110.

A non-limiting example of a method of manufacturing a magnetic sensor according to the present example embodiment will be described below. As shown in FIGS. 1 to 5, first magnetoresistance effect element 100 (MR1), second magnetoresistance effect element 100 (MR2), third magnetoresistance effect element 100 (MR3), and fourth magnetoresistance effect element 100 (MR4) are provided that include magnetoresistance effect stacks 110 and are electrically connected to each other to define a bridge circuit. Each magnetoresistance effect stack 110 includes the magnetized fixed layer, non-magnetic layer 112, and magnetized free layer 113 stacked in this order.

Figure 7:
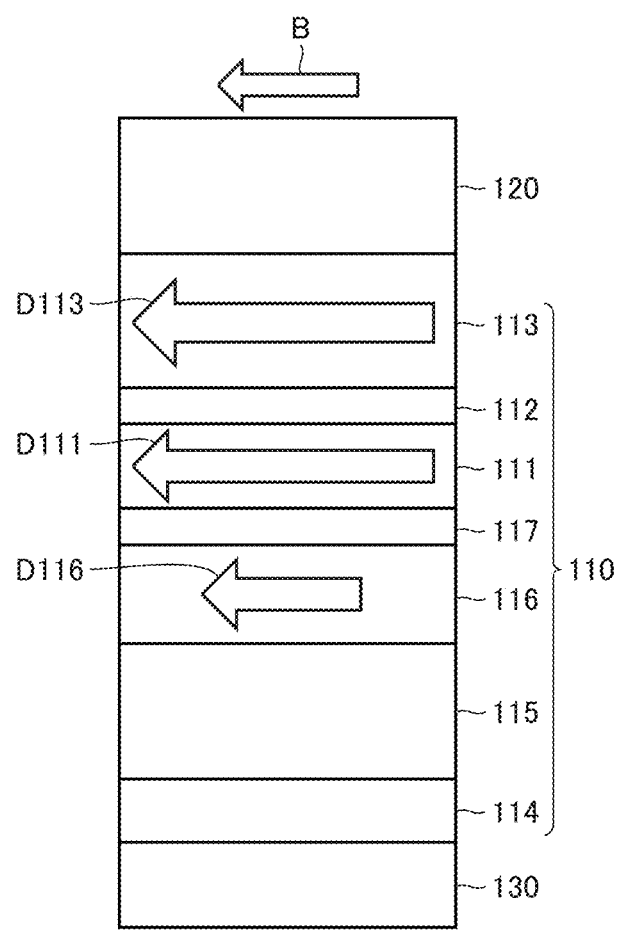
FIG. 7 is a partial side view showing a state where heat treatment is performed on the magnetoresistance effect stack while applying a magnetic field thereto.

A description will now be provided of a way to bring the magnetized fixed layer in magnetoresistance effect stack 110 into a magnetization state fixed to a certain direction. FIG. 7 is a partial side view showing a state where heat treatment is performed on a magnetoresistance effect stack while applying a magnetic field thereto.

As shown in FIG. 7, after the formation of an MR film, heating is performed for a predetermined period of time while applying a magnetic field B in one direction. At this time, a magnetization direction D116 of pinned layer 116, a magnetization direction D111 of reference layer 111, and a magnetization direction D113 of magnetized free layer 113 are each oriented in the same or substantially the same direction as magnetic field B.

Figure 8:
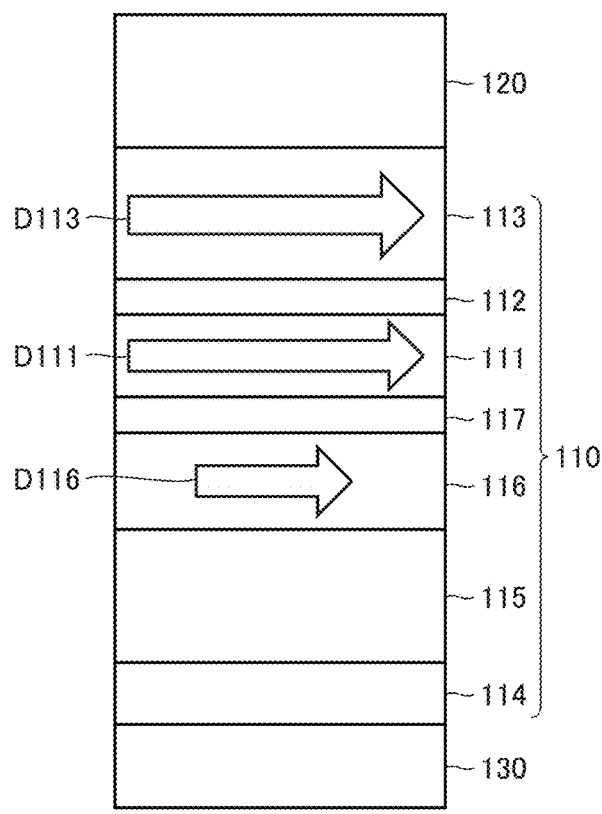
FIG. 8 is a partial side view showing a state where application of a magnetic field to the magnetoresistance effect stack is stopped to reduce the temperature to normal temperature.

FIG. 8 is a partial side view showing a state where the application of a magnetic field to the magnetoresistance effect stack is stopped to reduce the temperature to normal temperature. As shown in FIG. 8, as the application of a magnetic field is stopped to reduce the temperature to normal temperature, magnetization direction D111 of reference layer 111 becomes opposite, and magnetization direction D116 of pinned layer 116 and magnetization direction D111 of reference layer 111 become antiparallel to each other. Magnetization direction D113 of magnetized free layer 113 is oriented in the same or substantially the same direction as magnetization direction D111 of reference layer 111.

Figure 9:
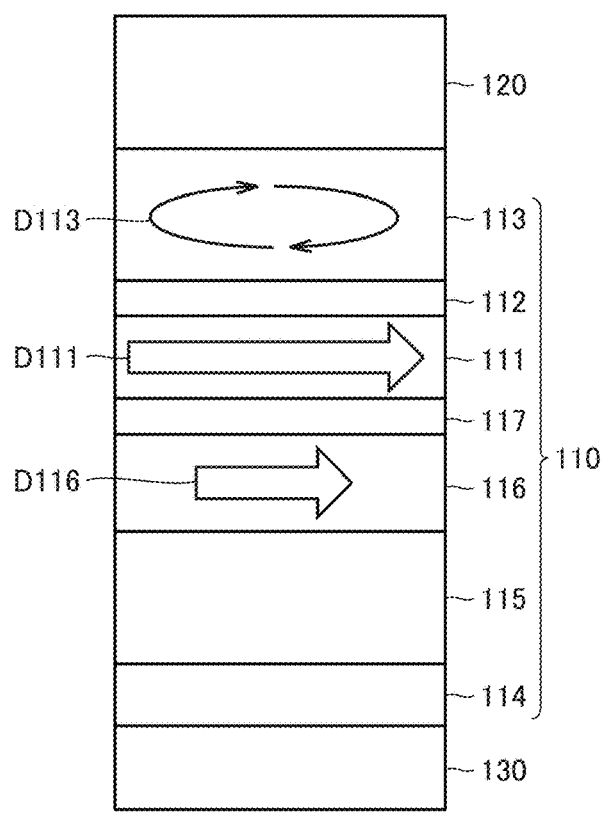
FIG. 9 is a partial side view showing a state where the magnetoresistance effect stack is patterned in a dot shape.

FIG. 9 is a partial side view showing a state where magnetoresistance effect stack is patterned in a dot shape. As shown in FIG. 9, as magnetoresistance effect stack 110 is patterned in a dot shape, the magnetization direction of magnetized free layer 113 shows isotropy, and thus, the magnetization direction changes according to a signal magnetic field.

In the above-described example of a method of manufacturing a magnetic sensor according to the present example embodiment, the following steps are performed in fixing the magnetization directions of the magnetized fixed layers in magnetoresistance effect stacks 110.

Figure 10:
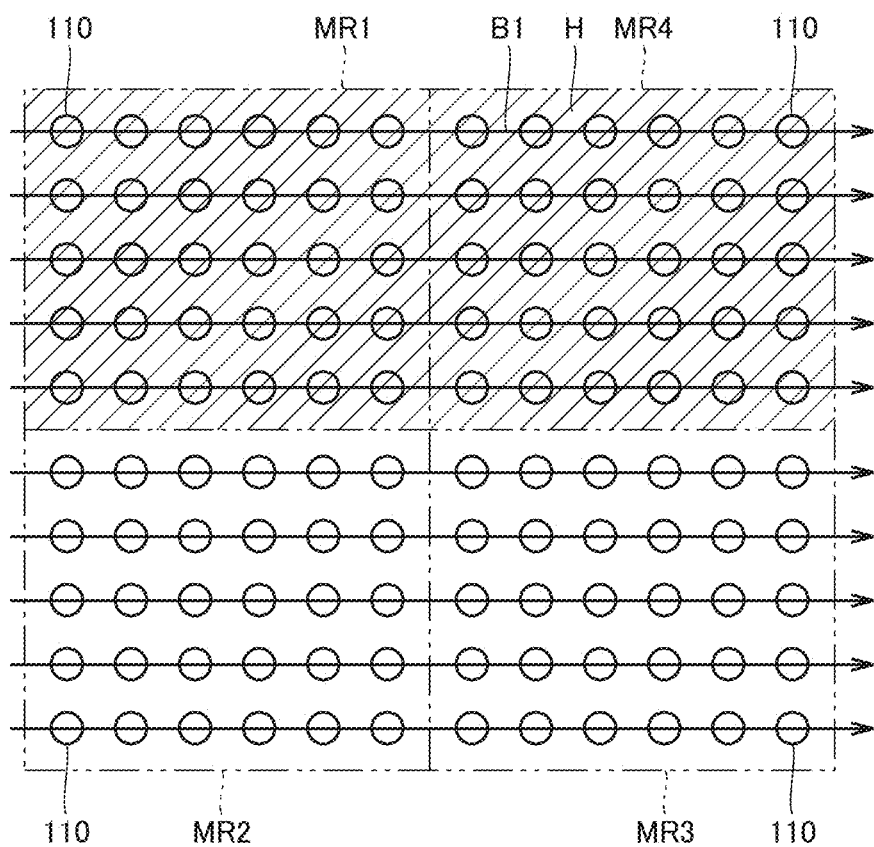
FIG. 10 is a cross-sectional view showing a state where heat treatment is performed on all of the magnetoresistance effect stacks in each of the first magnetoresistance effect element and the fourth magnetoresistance effect element while applying a magnetic field oriented in a second direction thereto.

FIG. 10 is a cross-sectional view showing a state where heat treatment is performed on all of magnetoresistance effect stacks while applying a magnetic field oriented in the second direction thereto in each of the first magnetoresistance effect element and the fourth magnetoresistance effect element.

As shown in FIG. 10, all of magnetoresistance effect stacks 110 are heated for a certain period of time while applying a magnetic field B1 oriented in the second direction thereto in each of first magnetoresistance effect element 100 (MR1) and fourth magnetoresistance effect element 100 (MR4). In other words, all of magnetoresistance effect stacks 110 in each of first magnetoresistance effect element 100 (MR1) and fourth magnetoresistance effect element 100 (MR4) are located in a heating region H, and all of magnetoresistance effect stacks 110 in each of second magnetoresistance effect element 100 (MR2) and third magnetoresistance effect element 100 (MR3) are not located in heating region H.

Subsequently, as the temperature is reduced to a normal temperature while applying magnetic field B1, in each of first magnetoresistance effect element 100 (MR1) and fourth magnetoresistance effect element 100 (MR4), the magnetized fixed layer has the magnetization state fixed to the first direction in all of magnetoresistance effect stacks 110.

Figure 11:
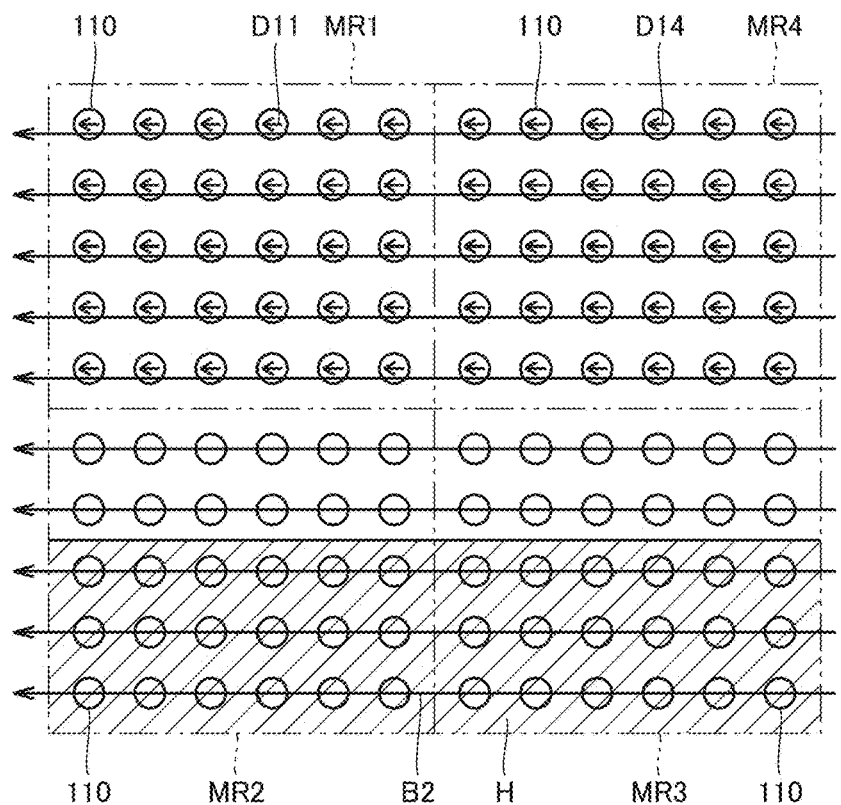
FIG. 11 is a cross-sectional view showing a state where heat treatment is performed on some of the magnetoresistance effect stacks in each of the second magnetoresistance effect element and the third magnetoresistance effect element while applying a magnetic field oriented in a first direction thereto.

FIG. 11 is a cross-sectional view showing a state where heat treatment is performed on some of a plurality of magnetoresistance effect stacks while applying a magnetic field oriented in the first direction thereto in each of the second magnetoresistance effect element and the third magnetoresistance effect element.

As shown in FIG. 11, only some of magnetoresistance effect stacks 110 in each of second magnetoresistance effect element 100 (MR2) and third magnetoresistance effect element 100 (MR3) are heated for a certain period of time while applying a magnetic field B2 oriented in the first direction to all of magnetoresistance effect stacks 110 in each of second magnetoresistance effect element 100 (MR2) and third magnetoresistance effect element 100 (MR3). In other words, some of magnetoresistance effect stacks 110 in each of second magnetoresistance effect element 100 (MR2) and third magnetoresistance effect element 100 (MR3) are located in heating region H, and the others of magnetoresistance effect stacks 110 in each of second magnetoresistance effect element 100 (MR2) and third magnetoresistance effect element 100 (MR3) are not located in heating region H.

Subsequently, as the temperature is reduced to a normal temperature while applying magnetic field B2, in each of second magnetoresistance effect element 100 (MR2) and third magnetoresistance effect element 100 (MR3), the magnetized fixed layer has the magnetization state fixed to the second direction in some of magnetoresistance effect stacks 110.

Through the steps described above, the magnetic sensor having the magnetization state shown in FIG. 6 can be manufactured. When the others of magnetoresistance effect stacks 110 in each of second magnetoresistance effect element 100 (MR2) and third magnetoresistance effect element 100 (MR3) include a portion in which the magnetized fixed layer has the magnetization state fixed to the direction different from the second direction, at least some of the others of magnetoresistance effect stacks 110 in each of second magnetoresistance effect element 100 (MR2) and third magnetoresistance effect element 100 (MR3) are heated for a predetermined period of time while applying thereto a magnetic field oriented in the direction different from the second direction.

The heat treatment in this step may be performed due to the influence of heat in heating of all of magnetoresistance effect stacks 110 in each of first magnetoresistance effect element 100 (MR1) and fourth magnetoresistance effect element 100 (MR4) or the influence of heat in heat treatment of some of magnetoresistance effect stacks 110 in each of second magnetoresistance effect element 100 (MR2) and third magnetoresistance effect element 100 (MR3). In other words, with magnetic field B1 or magnetic field B2 applied thereto in a direction different from each of the first direction and the second direction, heat treatment may be performed on at least some of the others of magnetoresistance effect stacks 110 in each of second magnetoresistance effect element 100 (MR2) and third magnetoresistance effect element 100 (MR3) due to the influence of heat.

Figure 12:
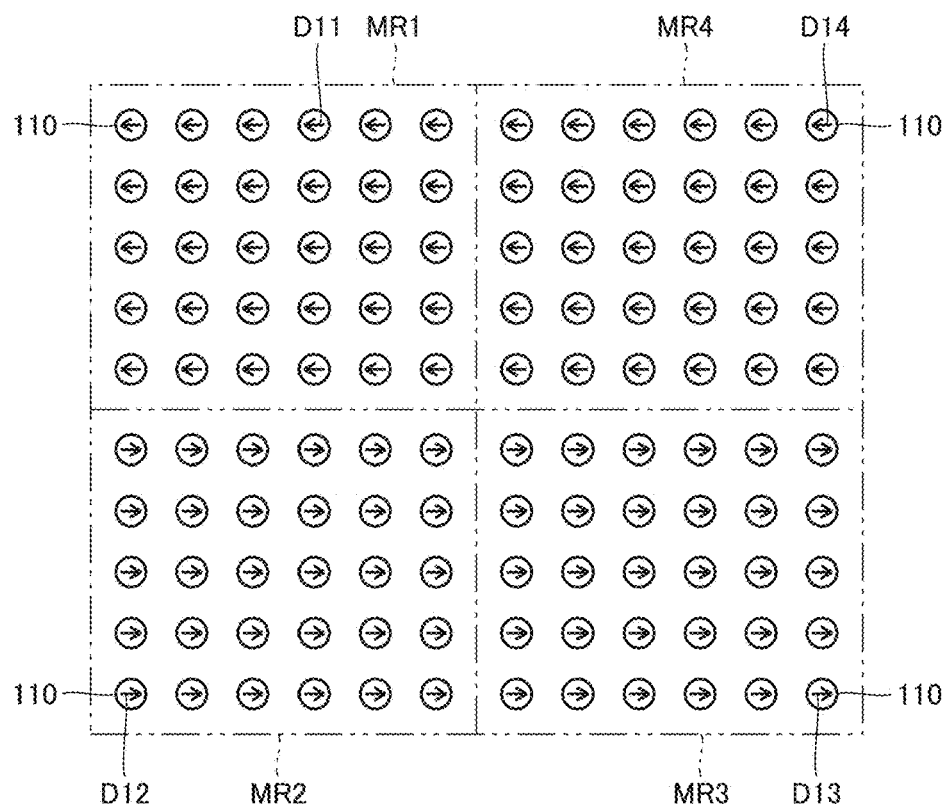
FIG. 12 is a cross-sectional view showing magnetization states of magnetized fixed layers of a plurality of magnetoresistance effect stacks of each of a first magnetoresistance effect element, a second magnetoresistance effect element, a third magnetoresistance effect element, and a fourth magnetoresistance effect element of a magnetic sensor according to a comparative example.

A magnetic sensor according to a comparative example will now be described. FIG. 12 is a cross-sectional view showing a magnetization state of magnetized fixed layers of a plurality of magnetoresistance effect stacks in each of a first magnetoresistance effect element, a second magnetoresistance effect element, a third magnetoresistance effect element, and a fourth magnetoresistance effect element of the magnetic sensor according to the comparative example.

As shown in FIG. 12, in the magnetic sensor according to the comparative example, in each of first magnetoresistance effect element 100 (MR1) and fourth magnetoresistance effect element 100 (MR4), the magnetized fixed layer has the magnetization state fixed to the first direction in all of magnetoresistance effect stacks 110, and in each of second magnetoresistance effect element 100 (MR2) and third magnetoresistance effect element 100 (MR3), the magnetized fixed layer has the magnetization state fixed to the second direction in all of magnetoresistance effect stacks 110.

Figure 13:
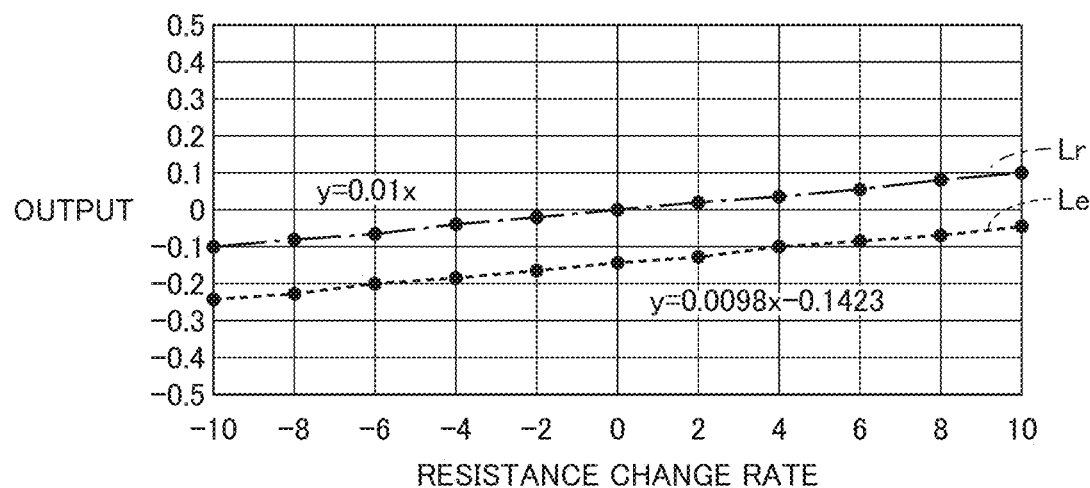
FIG. 13 is a graph showing the relationship between output and resistance change rate in magnetic sensors according to an example embodiment of the present invention and the comparative example.

FIG. 13 is a graph showing the relationship between output and resistance change rate in the magnetic sensors according to the present example embodiment and the comparative example. In FIG. 13, the vertical axis represents an output of a magnetic sensor, and the horizontal axis represents a resistance change rate of a magnetoresistance effect element. An approximation of straight line Lr of data on the magnetic sensor according to the comparative example is indicated by the alternate long and short dash line, and an approximation straight line Le of data on the magnetic sensor according to the present example embodiment is indicated by the dashed line. When the intensity of the signal magnetic field is zero, the resistance change rate is zero.

As shown in FIG. 13, in the magnetic sensor according to the comparative example, the output value of the magnetic sensor is zero when the intensity of the signal magnetic field is zero. Contrastingly, in magnetic sensor 1 according to the present example embodiment, the output value of the magnetic sensor when the intensity of the signal magnetic field is zero is displaced from zero. The slope of straight line Le, which indicates detection sensitivity of magnetic sensor 1 according to the present example embodiment, is approximately the same as the slope of straight line Lr, which indicates detection sensitivity of the magnetic sensor according to the comparative example.

As described above, in magnetic sensor 1 according to the present example embodiment, the output value when the intensity of the signal magnetic field is zero is displaced from zero due to a difference between the magnetization state of the magnetized fixed layers of magnetoresistance effect stacks 110 in each of first magnetoresistance effect element 100 (MR1) and fourth magnetoresistance effect element 100 (MR4) and the magnetization state of the magnetized fixed layers of magnetoresistance effect stacks 110 in each of second magnetoresistance effect element 100 (MR2) and third magnetoresistance effect element 100 (MR3).

A position detector including the magnetic sensor according to the present example embodiment will be described below.

Figure 14:
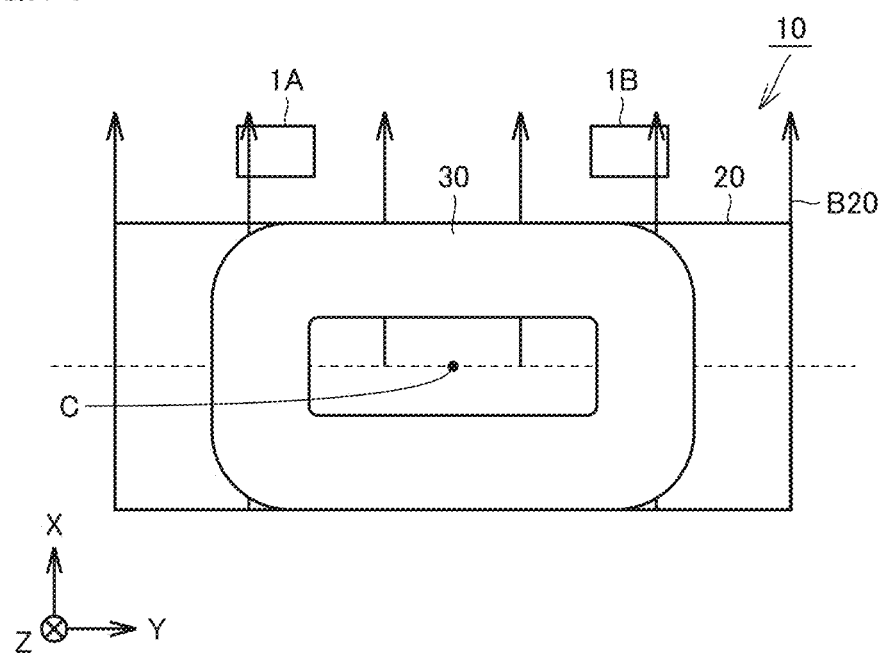
FIG. 14 is a front view showing a configuration of a position detector according to an example embodiment of the present invention.
Figure 15:
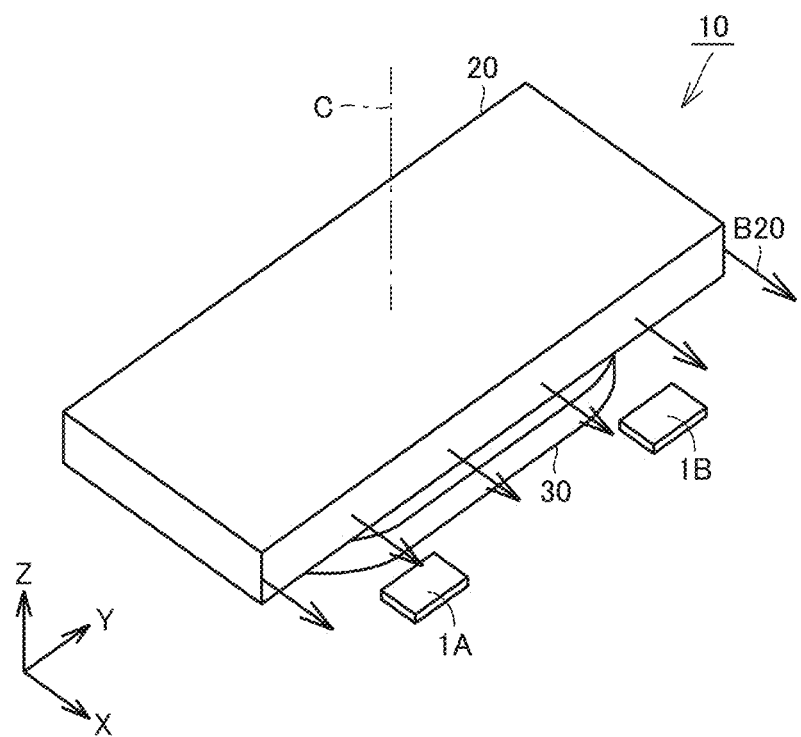
FIG. 15 is a perspective view of a position detector shown in FIG. 14, which is viewed from the magnet side.

FIG. 14 is a front view showing a configuration of a position detector according to an example embodiment of the present invention. FIG. 15 is a perspective view of the position detector shown in FIG. 14, which is viewed from the magnet side. FIGS. 14 and 15 show the state where magnet is located at a reference position.

As shown in FIGS. 14 and 15, a position detector 10 according to an example embodiment of the present invention includes a first magnetic sensor 1A, a second magnetic sensor 1B, a magnet 20, and a coil 30. Magnet 20 and coil 30 form a so-called voice coil motor. Position detector 10 is electrically connected to a driver IC (not shown).

Magnet 20 is movable relative to each of first magnetic sensor 1A and second magnetic sensor 1B from the reference position. In the present example embodiment, magnet 20 is rotatably supported about a central axis C of magnet 20 extending in the Z-axis direction. Magnet 20 may be movably supported along the Y-axis direction.

Each of first magnetic sensor 1A and second magnetic sensor 1B detects a signal magnetic field B20 applied from magnet 20. Based on a detection value of each of first magnetic sensor 1A and second magnetic sensor 1B, the rotation angle of magnet 20 is detected.

As shown in FIGS. 14 and 15, each of first magnetic sensor 1A and second magnetic sensor 1B is positioned so as not to face the central portion of magnet 20 located at the reference position.

Figure 16:
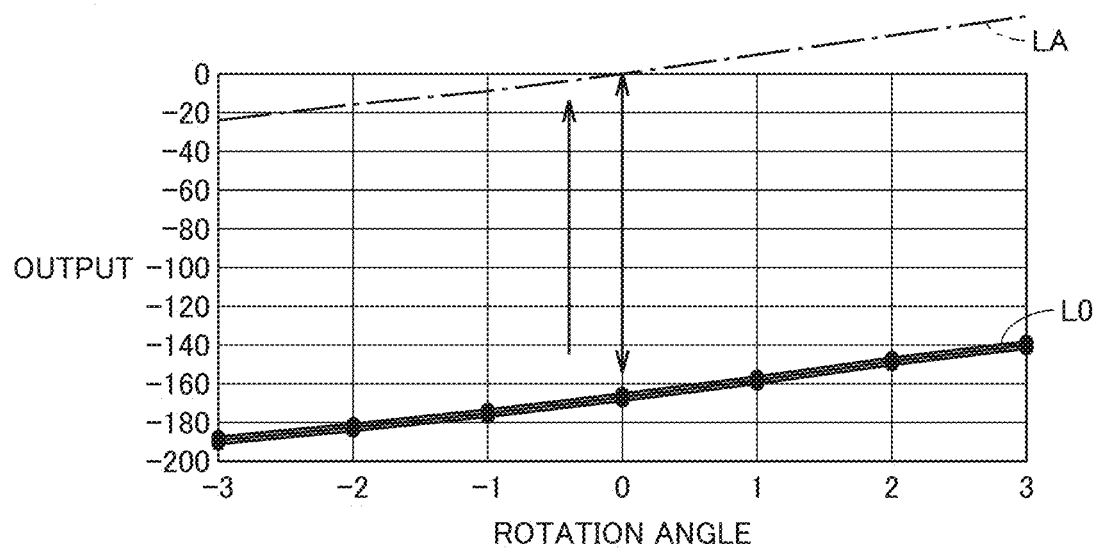
FIG. 16 is a graph showing the relationship between a rotation angle of a magnet and a total output of a first magnetic sensor and a second magnetic sensor in the magnetic sensors according to an example embodiment and the comparative example.

FIG. 16 is a graph showing the relationship between the total output of the first magnetic sensor and the second magnetic sensor and the rotation angle of the magnet in the position detectors according to the present example embodiment and the comparative example. In FIG. 16, the vertical axis represents the total output of the first magnetic sensor and the second magnetic sensor, and the horizontal axis represents the rotation angle of magnet 20 from the reference position. Data L0 on the position detector according to the comparative example is indicated by the solid line, and data LA on the position detector according to the present example embodiment is indicated by the alternate long and short dash line.

In the position detector according to the comparative example, the first magnetic sensor and the second magnetic sensor are different from first magnetic sensor 1A and second magnetic sensor 1B only in that the magnetoresistance effect element of each of the first and second magnetic sensors has the magnetization state shown in FIG. 12.

As shown in FIG. 16, in the position detector according to the comparative example, each of the first magnetic sensor and the second magnetic sensor is positioned so as not to face the central portion of magnet 20 located at the reference position, and accordingly, the total output value of the first magnetic sensor and the second magnetic sensor is greatly displaced from zero when the rotation angle is zero, that is, when magnet 20 is located at the reference position. In such a case, the driver IC cannot be drivingly controlled based on detection signals of the first magnetic sensor and the second magnetic sensor.

Contrastingly, in position detector 10 according to the present example embodiment, the output value when the intensity of the signal magnetic field is zero is displaced from zero in each of first magnetic sensor 1A and second magnetic sensor 1B, and accordingly, the total output value of first magnetic sensor 1A and second magnetic sensor 1B when the rotation angle is zero, that is, when magnet 20 is located at the reference position, is offset to be near zero. Thus, the driver IC can be drivingly controlled based on detection signals of first magnetic sensor 1A and second magnetic sensor 1B.

As described above, in position detector 10 according to the present example embodiment, the output value when the signal magnetic field of magnetic sensor 1 is zero is displaced from zero, increasing the degree of flexibility in designing a magnetic circuit with respect to, for example, the positional relationship between magnetic sensor 1 and magnet 20.

The magnetic sensor according to the present example embodiment can be manufactured merely by adjusting the magnetization state of the magnetized fixed layer without changing the configuration of magnetoresistance effect element 100, and thus, the degree of flexibility in designing a magnetic circuit can be increased easily.

The amount of displacement of the output value when the signal magnetic field of magnetic sensor 1 is zero can be adjusted by changing the ratio between some and the others of magnetoresistance effect stacks 110 in each of second magnetoresistance effect element 100 (MR2) and third magnetoresistance effect element 100 (MR3). This can also increase the degree of flexibility in designing a magnetic circuit.

In the above description of the example present embodiment, combinable configurations may be combined with each other.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A magnetic sensor comprising:
a first magnetoresistance effect element;
a second magnetoresistance effect element;
a third magnetoresistance effect element; and
a fourth magnetoresistance effect element; wherein
the first magnetoresistance effect element, the second magnetoresistance effect element, the third magnetoresistance effect element, and the fourth magnetoresistance effect element are electrically connected to each other to define a bridge circuit;
upon application of a signal magnetic field, the second magnetoresistance effect element and the third magnetoresistance effect element experience a resistance change opposite in direction to a resistance change of the first magnetoresistance effect element and the fourth magnetoresistance effect element;
each of the first magnetoresistance effect element, the second magnetoresistance effect element, the third magnetoresistance effect element, and the fourth magnetoresistance effect element includes a plurality of magnetoresistance effect stacks electrically connected to each other;
each of the plurality of magnetoresistance effect stacks includes a magnetized fixed layer, a non-magnetic layer, and a magnetized free layer stacked in this order, a magnetization direction of the magnetized free layer being changeable according to the signal magnetic field;
in each of the first magnetoresistance effect element and the fourth magnetoresistance effect element, the magnetized fixed layer has a magnetization state fixed to a first direction in all of the plurality of magnetoresistance effect stacks;
in each of the second magnetoresistance effect element and the third magnetoresistance effect element, the magnetized fixed layer has a magnetization state fixed to a second direction opposite to the first direction in at least one of the plurality of magnetoresistance effect stacks, and others of the plurality of magnetoresistance effect stacks include at least one of a portion in which the magnetized fixed layer has a magnetization state fixed to a direction different from the second direction and a portion in which the magnetized fixed layer has a magnetization state where a magnetization direction changes according to the signal magnetic field; and an output value of the magnetic sensor when an intensity of the signal magnetic field is zero is displaced from zero due to a difference between the magnetization state of a plurality of the magnetized fixed layers of the plurality of magnetoresistance effect stacks in each of the first magnetoresistance effect element and the fourth magnetoresistance effect element and the magnetization state of a plurality of the magnetized fixed layers of the plurality of magnetoresistance effect stacks in each of the second magnetoresistance effect element and the third magnetoresistance effect element.

2. The magnetic sensor according to claim 1, wherein maximum electrical resistance values to be maintained by the plurality of magnetoresistance effect stacks of the first magnetoresistance effect element, the second magnetoresistance effect element, the third magnetoresistance effect element, and the fourth magnetoresistance effect element are equal or substantially equal to each other.

3. The magnetic sensor according to claim 2, wherein numbers of the plurality of magnetoresistance effect stacks of the first magnetoresistance effect element, the second magnetoresistance effect element, the third magnetoresistance effect element, and the fourth magnetoresistance effect element are equal or substantially equal to each other.

4. The magnetic sensor according to claim 3, wherein the plurality of magnetoresistance effect stacks included in the first magnetoresistance effect element, the second magnetoresistance effect element, the third magnetoresistance effect element, and the fourth magnetoresistance effect element are located with a four-fold rotational symmetry as viewed from a stack direction of the plurality of magnetoresistance effect stacks.

5. The magnetic sensor according to claim 3, wherein the plurality of magnetoresistance effect stacks included in the first magnetoresistance effect element, the second magnetoresistance effect element, the third magnetoresistance effect element, and the fourth magnetoresistance effect element are located with a two-fold rotational symmetry as viewed from a stack direction of the plurality of magnetoresistance effect stacks.

6. A position detector comprising:
the magnetic sensor according to claim 1; and
a magnet movable relative to the magnetic sensor from a reference position; wherein
the magnetic sensor is positioned so as not to face a central portion of the magnet located at the reference position, and is operable to detect the signal magnetic field applied from the magnet; and
an output value of the magnetic sensor when the magnet is located at the reference position is zero.

7. The position detector according to claim 6, wherein maximum electrical resistance values to be maintained by the plurality of magnetoresistance effect stacks of the first magnetoresistance effect element, the second magnetoresistance effect element, the third magnetoresistance effect element, and the fourth magnetoresistance effect element are equal or substantially equal to each other.

8. The position detector according to claim 7, wherein numbers of the plurality of magnetoresistance effect stacks of the first magnetoresistance effect element, the second magnetoresistance effect element, the third magnetoresistance effect element, and the fourth magnetoresistance effect element are equal or substantially equal to each other.

9. The position detector according to claim 8, wherein the plurality of magnetoresistance effect stacks included in the first magnetoresistance effect element, the second magnetoresistance effect element, the third magnetoresistance effect element, and the fourth magnetoresistance effect element are located with a four-fold rotational symmetry as viewed from a stack direction of the plurality of magnetoresistance effect stacks.

10. The position detector according to claim 7, wherein the plurality of magnetoresistance effect stacks included in the first magnetoresistance effect element, the second magnetoresistance effect element, the third magnetoresistance effect element, and the fourth magnetoresistance effect element are located with a two-fold rotational symmetry as viewed from a stack direction of the plurality of magnetoresistance effect stacks.

11. The magnetic sensor according to claim 1, wherein each of each of the first, second, third, and fourth magnetoresistance effect elements includes upper electrodes and lower electrodes sandwiching a respective one of the plurality of magnetoresistance effect stacks.

12. The magnetic sensor according to claim 11, wherein
the upper electrodes are arranged in a matrix; and
the lower electrodes are arranged in a matrix.

13. The magnetic sensor according to claim 11, wherein the upper electrodes have a disk shape.

14. The magnetic sensor according to claim 11, wherein the lower electrodes have a disk shape.

15. The magnetic sensor according to claim 11, wherein a diameter of the upper electrodes is about 9 µm.

16. The magnetic sensor according to claim 11, wherein a thickness of the upper electrodes is about 0.1 µm.

17. The magnetic sensor according to claim 11, wherein a diameter of the lower electrodes is about 9 µm.

18. The magnetic sensor according to claim 11, wherein a thickness of the lower electrodes is about 0.1 µm.

19. A method of manufacturing a magnetic sensor, the method comprising:
forming a first magnetoresistance effect element, a second magnetoresistance effect element, a third magnetoresistance effect element, and a fourth magnetoresistance effect element electrically connected to each other to form a bridge circuit, each of the first, second, third, and fourth magnetoresistance effect elements including a plurality of magnetoresistance effect stacks, each of the magnetoresistance effect stacks including a magnetized fixed layer, a non-magnetic layer, and a magnetized free layer stacked in order, a magnetization direction of the magnetized free layer changing according to a signal magnetic field;
bringing the magnetized fixed layer into a magnetization state fixed to a first direction in all of the plurality of magnetoresistance effect stacks in each of the first magnetoresistance effect element and the fourth magnetoresistance effect element; and
bringing the magnetized fixed layer into a magnetization state fixed to a second direction opposite to the first direction in at least one of the plurality of magnetoresistance effect stacks in each of the second magnetoresistance effect element and the third magnetoresistance effect element.

20. The method of manufacturing a magnetic sensor according to claim 19, wherein in the bringing the magnetized fixed layer into the magnetization state fixed to the second direction in the at least one of the plurality of magnetoresistance effect stacks in each of the second magnetoresistance effect element and the third magnetoresistance effect element, the at least one of the plurality of magnetoresistance effect stacks in each of the second magnetoresistance effect element and the third magnetoresistance effect element are heated while applying a magnetic field in the second direction to all of the plurality of magnetoresistance effect stacks in each of the second magnetoresistance effect element and the third magnetoresistance effect element.

* * * * *